L. C. SHARP.
MOTOR VEHICLE STEERING MECHANISM.
APPLICATION FILED OCT. 27, 1917.

1,300,886.

Patented Apr. 15, 1919.
2 SHEETS—SHEET 1.

L. C. SHARP, Inventor.

Witness:
A. W. Jamieson.

By David O. Barnell,
Attorney.

L. C. SHARP.
MOTOR VEHICLE STEERING MECHANISM.
APPLICATION FILED OCT. 27, 1917.

1,300,886.

Patented Apr. 15, 1919.
2 SHEETS—SHEET 2.

L. C. SHARP, Inventor.

Witness:
All Jamieson.

By David O. Barnell.
Attorney.

UNITED STATES PATENT OFFICE.

LEE C. SHARP, OF PLATTSMOUTH, NEBRASKA.

MOTOR-VEHICLE STEERING MECHANISM.

1,300,886.   Specification of Letters Patent.   Patented Apr. 15, 1919.

Application filed October 27, 1917. Serial No. 198,892.

*To all whom it may concern:*

Be it known that I, LEE C. SHARP, a citizen of the United States, and a resident of Plattsmouth, in the county of Cass and State of Nebraska, have invented certain new and useful Improvements in Motor-Vehicle Steering Mechanism, of which the following is a specification.

My invention relates to steering mechanism for motor-vehicles, and it is the object thereof to provide in such mechanism means for connecting the steering-post and the worm-and-worm-wheel device, by which said parts are maintained in operative relation without special adjustment thereof, and the transmission of vibrations to the steering-post substantially eliminated. Further objects of my invention are to provide in a mechanism of this class certain structural details facilitating the assembling and adjustment thereof, as will be hereinafter fully set forth.

Figure 1:
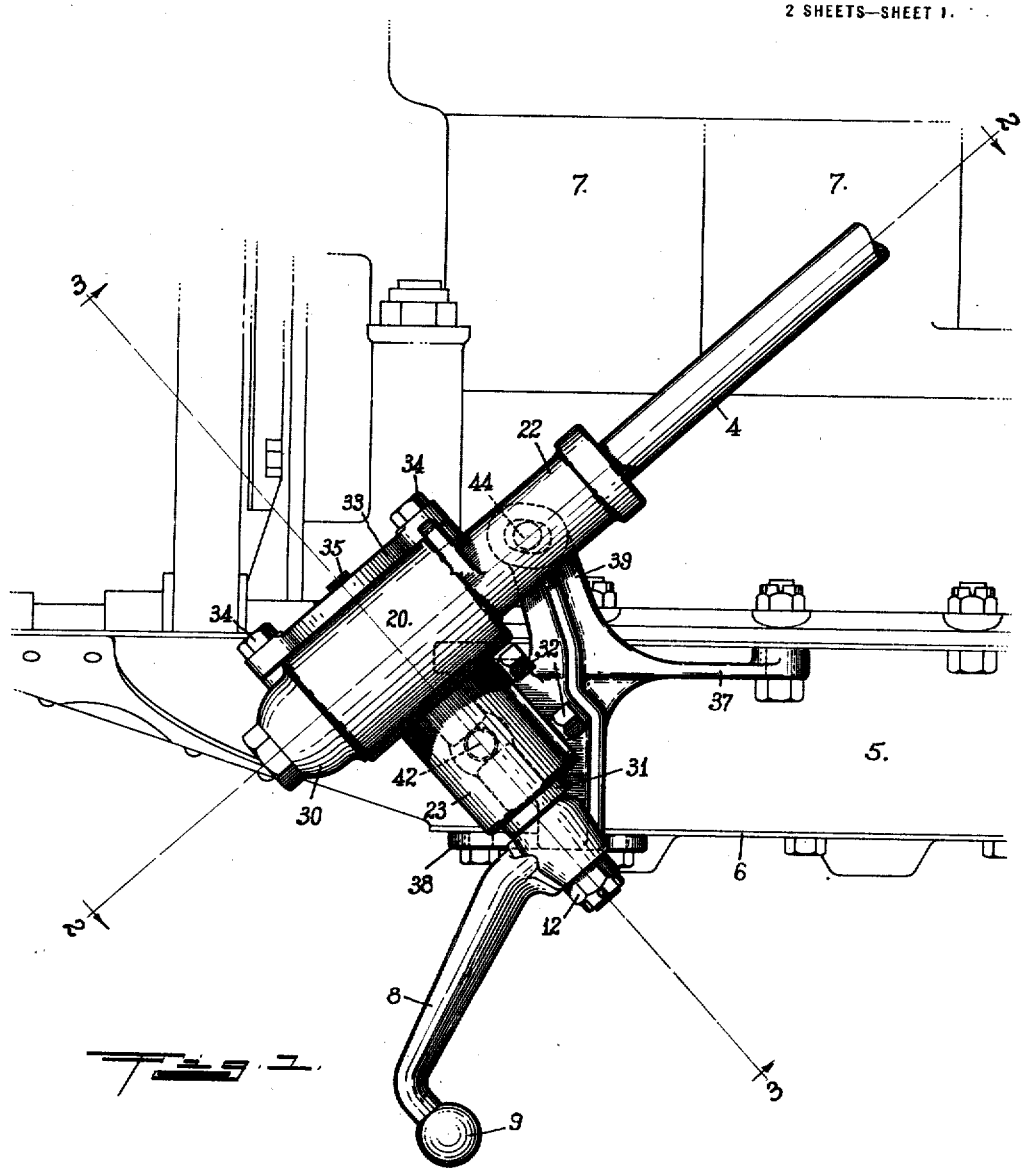
Figure 2:
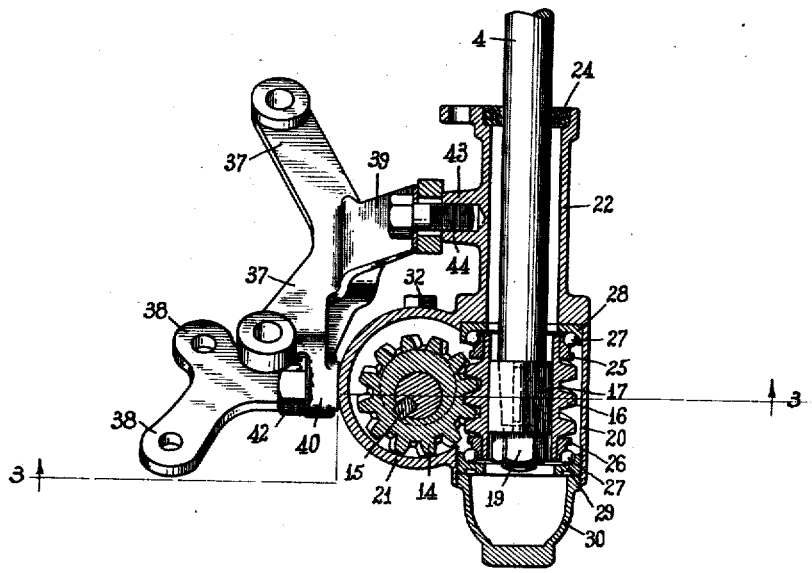
Figure 3:
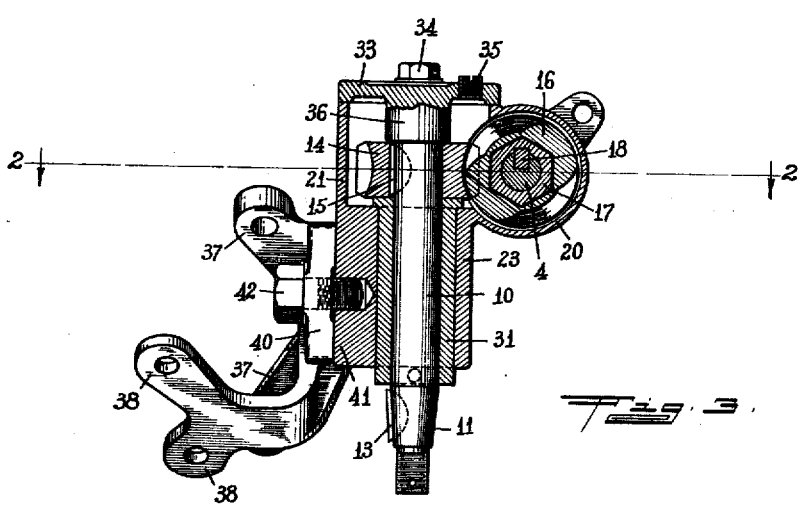

In the accompanying drawings Figure 1 is a side view of mechanism embodying my invention, Fig. 2 is a longitudinal section thereof on the diagonal plane of the lines 2—2 of Figs. 1 and 3, and Fig. 3 is a transverse section thereof on the diagonal and slightly offset plane of the lines 3—3 of Figs. 1 and 2.

The illustrated mechanism is especially designed for use on the well-known "Ford" motor-vehicles, and is intended to be substituted for the plain crank device commonly used at the lower end of the steering-post in said vehicles. There are shown in the drawings certain of the ordinary parts of such a vehicle, said parts being those with which my mechanism is associated and connected when in use, but it will be understood that my invention is applicable to any steering mechanism of the general type disclosed. The associated parts above referred to are the lower portion of the steering-post or shaft 4, a part of the crank-case 5 of the engine, the bottom-plate or cover 6 of said crank-case, portions of the engine cylinders 7, and the crank 8 which is ordinarily carried on the lower end of the steering-post, said crank being that whose movement is communicated to the steering-knuckles by means of a connecting-rod of which one end has a socket fitting upon the ball-head 9 of the crank.

In the construction illustrated, the knuckle-actuating crank 8 is carried on the lower part of a stem 10 which extends at right angles to the axis of the steering-post 4, the hub of the crank fitting upon a trunco-conical portion 11 of the stem, and being held thereon by means of a nut 12 screwed on the threaded end-portion thereof. The conical portion 11 is provided also with a key 13, shown in Fig. 3, and the entire lower portion of the stem 10 is the same in form as the lower end of the steering-post 4, so that the crank 8 is interchangeable between the ordinary position thereof and the position in which it is used in the structure illustrated. On the upper end of the stem 10 a worm-wheel 14 is secured by means of a key 15, and said worm-wheel meshes with a worm 16 having a hexagonal or other non-circular axial opening through it. Fitting slidably within said axial opening of the worm is a sleeve 17 which is secured upon the trunco-conical lower end-portion of the steering-post 4 by means of a key 18 and nut 19, the latter being screwed onto the threaded end of the steering-post, as shown. The sleeve 17 thus occupies the same place on the steering-post from which the crank 8 is removed when substituting the worm-and-worm-wheel device for the plain crank mechanism. A casing or housing is provided, comprising intersecting tubular portions 20 and 21 inclosing respectively the worm and worm-wheel, and portions 22 and 23 which are respectively coaxial with the tubular portions 20 and 21. The bore of the part 22 is larger than the diameter of the steering-post, or so that the sleeve 17 may be passed through the same in assembling the parts, and the upper end of the annular space between the steering-post and casing is closed by a packing-washer 24 of felt or the like, disposed in a counterbore at the upper end of the casing as shown in Fig. 2, said washer being adapted to exclude dust and the like from the casing. The worm 16 is supported revolubly in the casing-part 20, having ball-races 25 and 26 disposed on the upper and lower ends thereof, said races fitting against balls 27, and the latter engaging fixed races 28 and 29 disposed respectively at the upper and lower ends of the casing-part 20. The lower ball-race 29 is screwed into the end of the casing and is retained in adjusted positions therein by means of a hollow cap or screw-plug 30, said cap or plug serving both as a locknut or retainer for the ball-race and as a closure for the lower end of the worm-chamber. The casing-part 23 is bored to receive rotatably a sleeve 31 having an eccentric longitudinal opening in which the stem 10 fits revolubly. Set-screws 32 extending through the side of the casing-part 23 engage the side of the sleeve 31 to retain the same in adjusted relations to the casing. Rotation of the eccentric sleeve varies the relation of the worm-wheel to the worm, enabling said parts to be adjusted initially to a proper working relation, or readjusted to compensate for wear thereof after having been in use. The upper end of the worm-wheel housing 21 is closed by a plate 33 which is secured to the housing-body by cap-screws 34, the plate having at one side an oil-opening normally closed by a threaded plug 35. On the inner side of the plate 33 there is a lug 36 which extends down to the upper end of the stem 10 and serves to prevent end-play of said stem.

The casing or housing for the worm and worm-wheel is carried by a supporting-bracket which is removably attached to the engine, said bracket comprising a pair of upper arms 37 extending beneath the flange of the crank-case 5 and secured thereto by two of the same bolts employed for securing the crank-case to the engine-body, a pair of lower arms 38 extending beneath the crank-case and secured thereto by two of the screws employed for holding the lower cover 6, and arms 39 and 40 extending respectively adjacent to the sides of the parts 22 and 23 of the casing. The bracket-arm 40 fits against a lug 41 on the side of the casing-part 23 and is secured thereto by a screw 42 extending through the arm into a threaded opening in said lug, as shown in Fig. 3. The bracket-arm 39 fits against the end of a lug 43 on the side of the casing-part 22 and is secured thereto by a screw 44 passing through the arm into a threaded opening in the lug. The opening through the arm 39 for the screw 44 is slightly elongated to enable variation of the angular position of the housing, by tilting the same pivotally about the horizontal axis of the screw 42.

The operation of the described mechanism will be apparent to those skilled in the art, and need not be set forth in detail. It will be obvious that the axially slidable connection between the steering-post and the worm enables considerable longitudinal variation in the relation of the steering-post to the worm and housing, which avoids the necessity of any adjustment in the assembling of the worm-mechanism and steering-post, except alining the same by tilting the housing relatively to the supporting-bracket in a vertical plane about the axis of the screw 42. The sliding or "floating" connection also prevents transmission of vibrations longitudinally of the steering-post from the worm-mechanism to the hand-wheel at the upper end of the steering-post. The worm and worm-wheel bearings, being held in the housing independently of the steering-post, may be adjusted to a proper working relation when assembled at the factory, and the adjustment thereof need not be changed or disturbed when the steering mechanism is applied to the vehicle, since the sleeve 17 may be attached to the steering-post and inserted through the bore of the housing-part 22 without removal of any part of the housing inclosure except the packing-washer 24. This facility of assembly, without altering the adjustment of the working parts, is particularly desirable in a steering device of this character, intended to be supplied to the owners of used vehicles and substituted for other forms of steering devices thereon. It will be seen, however, that the invention is desirable and equally applicable when the mechanism is adopted as a part of the initial construction of a motor-vehicle, although in this event various minor details of the structure shown might be changed to conform with the associated parts of the vehicle on which it might be used.

Now, having described my invention, what I claim and desire to secure by Letters Patent is:

1. In a steering mechanism for motor-vehicles, the combination with a steering-post and a worm disposed coaxially therewith, of a fixed housing for said worm, bearing means revolubly supporting said worm in said housing, and means forming an axially slidable connection between the steering-post and worm and adapted to transmit rotary movement from the one to the other.

2. In a steering mechanism for motor-vehicles, a steering-post, a worm alined axially therewith, a fixed housing in which said worm is revolubly mounted, a worm-wheel mounted in said housing and meshing with the worm, and means connecting the worm and steering-post in fixed rotational and axially slidable relation to each other.

3. In a steering mechanism for motor-vehicles, a fixed housing, a worm-wheel, a worm meshing therewith and mounted revolubly in said housing, said worm having an axial opening of non-circular transverse sectional form, and a steering-post having a part fitting slidably within said opening through the worm and insertible therein through an opening in the housing.

4. In a steering mechanism for motor-vehicles, a fixed housing, a worm-wheel revolubly mounted therein, a tubular worm meshing with said worm-wheel and revolubly mounted in longitudinally fixed relation to the housing, a steering-post alined axially with said worm and extending into the bore thereof, and a sleeve secured to the steering-post and fitting slidably within the bore of the worm and non-rotatively interengaging therewith.

5. In a steering mechanism for motor-vehicles, a tubular worm, a member fitting non-rotatively and slidably within the bore of said worm, a steering-post on which said member is detachably secured, a worm-wheel meshing with said worm, a housing in which said worm and worm-wheel are revolubly mounted, a support for said housing, said housing being tiltable about said support to aline the axes of the steering-post and worm, and means for securing the housing and support in adjusted relations.

6. In a steering mechanism for motor-vehicles, a fixed housing, a gear-controlling member revolubly mounted in said housing and retained in axially fixed relation thereto, a hand-wheel shaft alined axially with said gear-controlling member, and means carried by said shaft and insertible therewith through an opening in the housing to engage said gear-controlling member non-rotatively, said means being freely slidable axially of said member and with respect to the housing.

LEE C. SHARP.

Copies of this patent may be obtained for five cents each, by addressing the "Commissioner of Patents, Washington, D. C."